3,071,571
COMPLEX METAL COMPOUNDS OF WATER-INSOLUBLE AZO-DYESTUFFS AND A PROCESS FOR THEIR MANUFACTURE
Richard Gross, Frankfurt am Main, and Hasso Hertel, Reinhard Mohr, and Walter Staab, Offenbach (Main), Germany, assignors to Farbwerke Hoechst Aktiengesellschaft vormals Meister Lucius & Brüning, Frankfurt am Main, Germany, a corporation of Germany
No Drawing. Filed Jan. 31, 1961, Ser. No. 86,006
Claims priority, application Germany Feb. 4, 1960
6 Claims. (Cl. 260—151)

The present invention provides new complex metal compounds of water-insoluble azo-dyestuffs and a process for their manufacture; more particularly it provides new complex metal compounds of water-insoluble azo-dyestuffs having the general formula

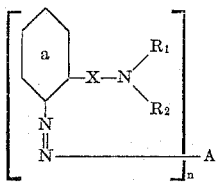

wherein X stands for a carbonyl or sulfonyl group, $R_1$ and $R_2$ stand for alkyl, aryl, cycloalkyl or aralkyl groups, or $R_1$ together with the nitrogen atom for a heterocyclic radical, the benzene nucleus $a$ may be substituted by groups which do not impart solubility in water, A represents the radical of a coupling component coupling in a position adjacent to the hydroxy group, with the exception of the arylamides of aromatic or heterocyclic o-hydroxycarboxylic acids, and $n$ stands for the integer 1 or 2.

The invention is based on the observation that new water-insoluble metalliferous azo-dyestuffs are obtained by coupling in substance, on the fiber or on another substratum the diazonium compounds of amines having the general formula

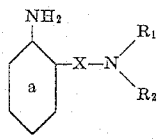

wherein X stands for a carbonyl or sulfonyl group, $R_1$ and $R_2$ stand for alkyl, aryl, cycloalkyl or aralkyl groups or together with the nitrogen atom for a heterocyclic radical, the benzene nucleus $a$ may contain substituents, with coupling components coupling in a position adjacent to the hydroxy group, with the exception of the arylamides of aromatic and heterocyclic o-hydroxycarboxylic acids, the components being selected so that they do not contain groups imparting solubility in water, for example carboxylic acid or sulfonic acid groups, and treating the dyestuffs so obtained with agents yielding metal.

As diazo components there may be used for the process of the present invention 1-aminobenzene-2-carboxylic acid amides or 1-aminobenzene-2-sulfonic acid amides of the above general formula which, in the benzene nucleus $a$ may contain substituents which do not impart solubility in water, for example, halogen atoms, nitro, alkyl, alkoxy, acyl, alkylsulfonic, arylsulfonic, carboxylic acid amide or sulfonic acid amide groups.

These compounds may be prepared according to known methods, for example by the reaction of o-nitrobenzoic acid chlorides or o-nitrobenzene-sulfonic acid chlorides with secondary amines and subsequent reduction of the nitro group, for example with iron in acid solution or by a catalytic reaction with nickel as a catalyst or by reaction of the corresponding o-chlorobenzene-sulfonic acid chlorides or o-chlorobenzene-carboxylic acid chlorides with the secondary amines and exchange of the chlorine atom for the amino group by heating with ammonia under pressure.

As coupling components there are used in the process of the present invention compounds, which are free from groups imparting solubility in water, as for example sulfonic acid or carboxylic acid groups and which are coupling in a position adjacent to the hydroxy group, i.e. aromatic or heterocyclic hydroxy compounds as well as compounds containing an enolisable or enolised ketomethylene group, for example the derivatives of the phenol substituted in 4-position, for example 4-chlorophenol, 4-hydroxy-1.2-xylene, 4-hydroxy-acetophenone or 4-hydroxybenzophenone, 4-methoxy or 4-phenoxyphenol, the derivatives of the α-naphthol substituted in 4-position, for example 4-chloro-1-naphthol, 4-methoxy-1-naphthol and 4-benzoyl-1-naphthol, furthermore β-naphthol and its derivatives, for example 6-bromo-2-naphthol, 7-methoxy-2-naphthol, 1-benzoylamino-7-naphthol and 4-phenylazo-1-amino-7-naphthol, as well as 6-hydroxyquinoline, 2- and 3-hydroxycarbazole, 3-hydroxydiphenylene oxide, 1-aryl-3-methyl-5-pyrazolone and aceto-acetic acid arylides.

Besides these monohydroxy compounds there are used as coupling components polyhydroxy compounds of the aromatic or heterocyclic series coupling in ortho-position to the hydroxy groups, for example resorcine, 4-benzoyl-resorcine, terephthaloyl-bis-resorcine, phloroglucine, 2.6-dihydroxynaphthalene and 3.6-dihydroxydiphenylene-oxide.

The new dyestuffs may be produced by different methods. Vegetable fibers, including fibers of regenerated cellulose, for example, may be impregnated with the alkaline solutions of the coupling components which, in most cases are not or only little substantive, and the excess of these solutions be drained off by pressing or centrifuging. After an eventual intermediate drying of the impregnated material to be dyed the formation of dyestuffs may be carried out in the usual manner in a developing bath containing the diazo compound of one of the amines used according to the present invention.

The metallization of the azo-dyestuffs may already be carried out in the developing bath by adding to the bath, before or during the coupling, agents yielding metal and by completing the metallization by raising the temperature. The metallization may, however, also be carried out after the coupling in a second bath which is neutral, weakly alkaline or weakly acid and which, besides compounds yielding metal, may contain dispersing agents or detergents, for example a fatty alcohol polyglycol ether, an alkylphenol polyglycol ether, an alkylnaphthol polyglycol ether, a fatty acid polyglycol ester or a fatty acid amide polyglycol ether.

When the process is carried out in an appropriate manner the new dyestuffs can also be produced on animal fibers, such as wool and silk, or on synthetic fibers such as polyamide or polyvinyl alcohol fibers.

The dyestuffs can also be prepared in substance and converted into complex metal compounds by treatment with agents yielding metal in an aqueous suspension or in organic solvents such as acetone or dimethylformamide. The dyestuffs so obtained are suitable for dyeing synthetic and animal fibers or for coloring organic plastic masses of high molecular weight.

As agents yielding metal, there are preferably used for the process of the present invention compounds yielding copper, cobalt, nickel, iron or manganese which may be used in the form of their mineral or organic salts such, for example as chlorides, bromides, sulfates, nitrates, formiates or acetates, or as complex compounds of these metals, especially with hydroxy-alkylamines such, for example as diethanolamine, triethanolamine or N-methylethanolamine or with amino-carboxylic acids, such as amino-acetic acid or nitrilotriacetic acid, with aliphatic hydroxycarboxylic acids, such as citric acid, tartaric acid, gluconic acid or glycolic acid, with alkali metal phosphates, such as alkali metal pyrophosphates or alkali metal polyphosphates. When an agent yielding cobalt is used, the addition of compounds of hexavalent chromium or other oxidizing agents, for example alkali metal perborates, alkali metal persulfates or alkali metal percarbonates has an advantageous effect on the metallization.

On vegetable fibers, there are obtained by the process according to the present invention dyestuffs which possess in addition to good general properties of fastness a very good fastness to light.

The following examples serve to illustrate the invention:

EXAMPLE 1

Cotton fabric was padded on the foulard with the following solution and dried:

14.4 grams of β-naphthol were pasted up with 30 grams of a wetting agent of the type of the oil-sulfonates and 10 cc. of sodium hydroxide solution of 38° Bé. and made up to 1 liter with boiling water containing, per liter, 3 grams of tragacanth as thickening agent.

The dried fabric was developed in the developing bath described below for 15 to 20 minutes at 20° C., and after slowly heating to 95° C., for 20 to 30 minutes at this temperature in a long liquor. Then the material was rinsed with a solution containing, per liter of water, 3 cc. of hydrochloric acid of 20° Bé., soaped for 15 minutes at 60° C. with a solution containing 2 grams of soap, per liter of water, rinsed again and dried.

*Developing Bath*

1.2 grams of 1 - aminobenzene - 2 - carboxylic acid-N-methyl-N-(4'-methylphenyl)-amide in the form of a diazo compound prepared according to known methods were dissolved in 1 liter of water containing 2 grams of a reaction product of about 20 mols of ethylene oxide and 1 mol of octadecyl alcohol, 1 cc. of acetic acid of 50% strength, 7 grams of sodium acetate and 1.25 grams of copper sulfate.

A reddish orange dyeing was obtained.

EXAMPLE 2

22.6 grams of 1-aminobenzene-2-carboxylic acid-N-methyl-N-phenylamide were dissolved in 400 cc. of water and 50 cc. of 5 N-hydrochloric acid. The solution was shortly diazotized at 30° C. with 20 cc. of 5 N-sodium nitrite solution. The clarified, yellow diazo solution was introduced, at about 30° C., into a fine suspension prepared from 17.5 grams of 1-phenyl-3-methyl-5-pyrazolone of 99.8% strength in 1000 cc. of water and 200 cc. of 2 N-sodium acetate solution. After the coupling the yellow azo dyestuff had nearly completely precipitated. The solution was neutralized with dilute sodium hydroxide solution, a solution containing 25 grams of crystallized copper sulfate in 100 cc. of water and 25 grams of triethanolamine was added and the whole was stirred for some hours at 90° C. to 95° C. After the metallization, the complex copper compound formed was filtered off with suction, washed with water and little ethylalcohol and dried at 60° C. to 70° C.

The dyestuff so obtained was an olivish brown powder which was dissolved in benzene to give a brown solution.

In the following table further components are listed which can be used in the process of the invention, and the tints produced by forming the metalliferous azo-dyestuffs from these components on the fibers which tints possess good fastness properties.

| Diazo component | Coupling component | Tint | | |
|---|---|---|---|---|
| | | Copper-complex | Cobalt complex | Nickel complex |
| 1-aminobenzene-2-carboxylic acid-N-methyl-N-(4'-methylphenyl)-amide. | β-Naphthol | Reddish-orange | Yellowish brown | Brownish orange. |
| Do | 4-chloro-1-naphthol | Brownish red | Brownish red | Brownish red. |
| Do | Resorcine | Yellow brown | Yellow brown | Yellow brown. |
| Do | 3-hydroxydiphenylene-oxide | Brownish yellow | Brownish yellow | Brownish yellow. |
| Do | Terephthaloyl-bis-resorcine | Yellowish brown | Yellowish brown | Yellowish brown. |
| Do | β-Cresol | Covered yellow | Covered yellow | Covered yellow. |
| Do | 2,6-dihydroxynaphthalene | Grey-brown | Brown | Brown. |
| Do | 3-hydroxydiphenylamine | Yellowish brown | Yellowish brown | Yellowish brown. |
| Do | 2-hydroxycarbazole | do | do | Yellow brown. |
| Do | 2,4-dihydroxybenzophenone | do | Yellow brown | Do. |
| Do | 3-hydroxycarbazole | Brown | Brown | Brown. |
| Do | p-Chlorophenol | Yellow brown | Yellow brown | Yellow brown. |
| 1-amino-4-nitrobenzene-2-carboxylic acid diethylamide. | β-Naphthol | Reddish brown | Reddish brown | Reddish brown. |
| 1-amino-4-chlorobenzene-2-carboxylic acid - N - methyl-N-phenylamide. | do | do | do | Do. |
| 1-aminobenzene-2-carboxylic acid piperidide | do | do | do | Do. |
| 1-aminobenzene-2,5-dicarboxylic acid dimethylamide. | do | do | do | Do. |
| 1-aminobenzene-2-sulfonic acid dimethylamide | do | Reddish orange | Reddish orange | Reddish orange. |
| Do | 4-chloro-1-naphthol | Brownish scarlet | Brownish orange | Brownish orange. |
| Do | Resorcine | Brownish orange | Brownish yellow | Brownish yellow. |
| Do | 3-hydroxydiphenylene-oxide | do | Brownish orange | Brownish orange. |
| Do | Terephaloyl-bis-resorcine | Brownish yellow | Yellow brown | Yellowish brown. |
| Do | p-Cresol | Brownish red | Brownish yellow | Brownish orange. |
| Do | 2,6-dihydroxynaphthalene | Brown | Brown | Brown. |
| Do | 3-hydroxydipenylamine | Yellowish red brown | Yellowish red brown | Yellowish brown. |
| Do | 2-hydroxycarbazole | Brownish yellow | Yellow brown | Do. |
| Do | 2,4-dihydroxybenzophenone | Flat orange | Brownish orange | Do. |
| Do | 3-hydroxycarbazole | Red brown | Red brown | Red brown. |
| Do | p-Chlorophenol | Brownish orange | Brownish orange | Brownish orange. |
| 1 - amino - 4 - nitrobenzene - 2 - sulfonic acid - N - methyl-N-phenylamide. | β-naphthol | Reddish orange | Reddish orange | Reddish orange. |
| 1 - amino - 5 - chlorobenzene - 2 - sulfonic acid - N - methyl-N-phenylamide. | do | do | do | Do. |
| 1-aminobenzene-2-sulfonic acid piperidide | do | do | do | Do. |
| 1-aminobenzene-2-carboxylic acid dibenzylamide | do | Yellow brown | Brown | Red brown. |
| Do | Resorcine | Brown | do | Yellow brown. |
| Do | 4-chloro-1-naphthol | Brownish garnet | Brownish garnet | Garnet. |
| Do | 3-hydroxydiphenylene-oxide | Red brown | Red brown | Brown. |
| Do | 2-hydroxycarbazole | Brown | Brown | Do. |
| Do | 2,4-dihydroxybenzophenone | do | Red brown | Yellowish brown. |
| Do | p-Chlorophenol | Brownish garnet | Brownish garnet | Brownish garnet. |
| Do | 3-hydroxycarbazole | Brown | Brown | |
| 1-aminobenzene-2-carboxylic acid-N-ethyl-N-(2'-methyl)-phenylamide. | β-Naphthol | do | do | Brown. |
| Do | Resorcine | Yellowish brown | Yellowish brown | Yellowish brown. |
| Do | 4-chloro-1-naphthol | Brownish garnet | Brownish garnet | Garnet. |
| Do | 3-hydroxydiphenylene-oxide | Brown | Brown | Brown. |

| Diazo component | Coupling component | Tint | | |
|---|---|---|---|---|
| | | Copper-complex | Cobalt complex | Nickel complex |
| 1-aminobenzene-2-carboxylic acid-N-ethyl-N-(2'-methyl)-phenylamide. | 2-hydroxycarbazole | Brown | Brown | Brown. |
| Do | 2.4-dihydroxybenzophenone | Yellowish brown | Yellowish brown | Yellowish brown. |
| Do | 3-hydroxycarbazole | Brown | Brown | Reddish brown. |
| Do | β-Naphthol | do | Yellowish brown | |
| 1-aminobenzene-2-sulfonic acid-N-methyl-N-phenylamide. | 4-chloro-1-naphthol | Brownish garnet | Brownish garnet | |
| Do | 3-hydroxydiphenylene-oxide | Brown | Yellow brown | |
| Do | 3-hydroxydiphenylamine | Yellowish brown | Yellowish brown | |
| Do | 2-hydroxycarbazole | Dark brown | Brown | Brown. |
| Do | 2.4-dihydroxybenzophenone | Yellowish brown | do | Yellowish brown. |
| Do | β-Naphthol | Brown | Brown | |
| 1-aminobenzene-2-sulfonic acid-N-ethyl-N-phenylamide. | Resorcine | do | | |
| Do | 4-chloro-1-naphthol | Brownish garnet | Brownish garnet | |
| Do | 3-hydroxydiphenylene-oxide | Red brown | Yellow brown | |
| Do | 3-hydroxydiphenylamine | Yellowish brown | Yellowish brown | |
| Do | 2-hydroxycarbazole | Dark brown | Brown | |
| Do | 2.4-dihydroxybenzophenone | Yellow brown | do | Yellow brown. |
| Do | 3-hydroxycarbazole | Brown | | |
| Do | β-Naphthol | do | | |
| 1-aminobenzene-2-carboxylic acid-N-methyl-N-phenylamide. | 4-chloro-1-naphthol | Red brown | Brownish, garnet | Garnet. |
| Do | 3-hydroxydiphenylene-oxide | Brown | Brown | Brown. |
| Do | β-Naphthol | do | | |
| 1-amino-4.5-dimethoxybenzene-2-sulfonic acid dimethylamide. | | | | |

We claim:

1. A complex metal compound containing a metal selected from the group consisting of copper, cobalt and nickel, of a water-insoluble azo-dyestuff having the formula

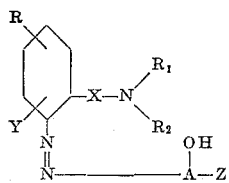

wherein R represents a member selected from the group consisting of a hydrogen atom, a chlorine atom, a nitro group, a methoxy and carboxylic acid dimethyl amide group, Y stands for a member selected from the group consisting of a hydrogen atom and a methoxy group, X represents a member selected from the group consisting of the carbonyl and sulfonyl group, $R_1$ and $R_2$ represent individually members selected from the group consisting of lower alkyl groups, a phenyl and benzyl group, and together with the nitrogen atom the radical of a piperidine ring, A stands for a member selected from the group consisting of benzene, naphthalene, carbazole, diphenylene oxide, diphenylamine and benzophenone, Z represents a member selected from the group consisting of a hydrogen atom, a chlorine atom, a hydroxy group and methyl group, and the group OH stands in a position adjacent to the azo group.

2. The nickel complex compound of the water-insoluble azo-dyestuff having the formula

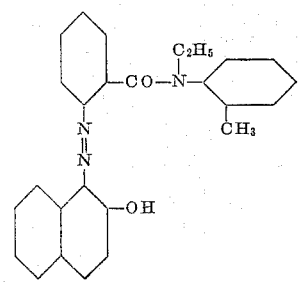

3. The nickel complex compound of the water-insoluble azo-dyestuff having the formula

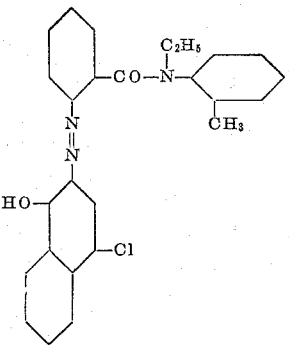

4. The copper complex compound of the water-insoluble azo-dyestuff having the formula

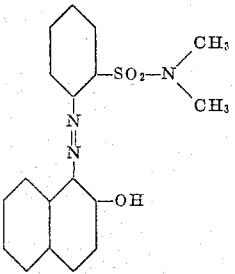

5. The copper complex compound of the water-insoluble azo-dyestuff having the formula

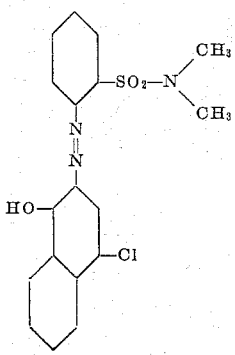

6. The copper complex compound of the water-insoluble azo-dyestuff having the formula
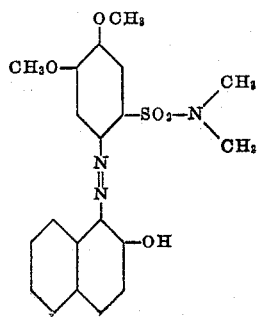
References Cited in the file of this patent
UNITED STATES PATENTS
| | | |
|---|---|---|
| 2,004,383 | Schimmelschmidt et al. | June 11, 1935 |
| 2,210,072 | Fischer | Aug. 6, 1940 |
| 2,270,678 | Fischer | Jan. 20, 1942 |
| 2,839,521 | Schetty | June 17, 1958 |